(12) United States Patent
    Chang

(10) Patent No.: US 9,521,007 B2
(45) Date of Patent: Dec. 13, 2016

(54) MULTI-LEVEL REPLICATION COUNTER STORAGE DEVICE FOR MULTICAST PACKET PROCESSING AND RELATED METHOD FOR MANAGING MULTICAST PACKET PROCESSING

(71) Applicant: MEDIATEK INC., Hsin-Chu (TW)

(72) Inventor: Chien-Hsiung Chang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 131 days.

(21) Appl. No.: 14/243,888

(22) Filed: Apr. 3, 2014

(65) Prior Publication Data

US 2014/0321464 A1    Oct. 30, 2014

Related U.S. Application Data

(60) Provisional application No. 61/815,913, filed on Apr. 25, 2013.

(51) Int. Cl.
    *H04W 4/00*    (2009.01)
    *H04L 12/18*   (2006.01)

(52) U.S. Cl.
    CPC .......... *H04L 12/1881* (2013.01); *H04L 12/18* (2013.01); *H04L 12/1845* (2013.01)

(58) Field of Classification Search
    CPC .............................. H04L 12/18; H04L 12/1845
    USPC .......................................................... 370/390
    See application file for complete search history.

(56) References Cited

U.S. PATENT DOCUMENTS

| 2002/0136230 | A1* | 9/2002 | Dell ..................... H04L 12/5693 370/416 |
| 2011/0286455 | A1* | 11/2011 | Brown ..................... H04L 47/30 370/390 |
| 2012/0002546 | A1* | 1/2012 | Sundararaman ...... H04L 49/101 370/235 |
| 2012/0020356 | A1* | 1/2012 | Ohno ...................... H04L 45/16 370/390 |
| 2012/0063318 | A1* | 3/2012 | Boddu ................ H04L 12/1881 370/235 |
| 2014/0254593 | A1* | 9/2014 | Mital ...................... H04L 12/18 370/390 |

FOREIGN PATENT DOCUMENTS

| CN | 1366400 A   | 8/2002 |
| CN | 1444812 A   | 9/2003 |
| CN | 1984079 A   | 6/2007 |
| CN | 101848150 A | 9/2010 |

* cited by examiner

*Primary Examiner* — Farah Faroul
(74) *Attorney, Agent, or Firm* — Winston Hsu; Scott Margo

(57) ABSTRACT

A multi-level replication counter storage device for multicast packet processing includes a first-level storage device and a second-level storage device. The first-level storage device stores a plurality of first count values associated with a same cell data of a first multicast packet required to be broadcasted to a plurality of multicast targets, wherein a sum of the stored first count values is equal to a number of multicast targets to which the same cell data of the first multicast packet is not broadcasted yet. The second-level storage device stores a second count value which is adjusted based on the first count values to indicate whether a multicast operation of the same cell data of the first multicast packet is accomplished.

19 Claims, 3 Drawing Sheets

MULTI-LEVEL REPLICATION COUNTER STORAGE DEVICE FOR MULTICAST PACKET PROCESSING AND RELATED METHOD FOR MANAGING MULTICAST PACKET PROCESSING

CROSS REFERENCE TO RELATED APPLICATIONS

This application claims the benefit of U.S. provisional application No. 61/815,913, filed on Apr. 25, 2013 and incorporated herein by reference.

BACKGROUND

The disclosed embodiments of the present invention relate to forwarding packets, and more particularly, to a multi-level replication counter storage device for multicast packet processing and related method for managing multicast packet processing.

A network switch is a computer networking device that links different electronic devices. For example, the network switch receives an incoming packet generated from a source electronic device connected to it, and transmits an outgoing packet derived from the received packet only to one or more destination electronic devices for which the received packet is meant to be received. In general, the network switch has a packet buffer for buffering packet data of packets received from ingress ports, and forwards the packets stored in the packet buffer through egress ports. If the same packet is requested by a group of destination electronic devices connected to different egress ports of the network switch, a requested packet, also known as a multicast packet, is obtained in a single transmission from a source electronic device connected to one ingress port of the network device, and a multicast operation is performed by the network switch to deliver/broadcast copies of the requested packet stored in the packet buffer to the group of destination electronic device. A replication counter (or called as multi-cast counter) is commonly used by the network switch to count the number of multicast or broadcast targets in a network.

In one conventional design, a counter storage device is realized by a memory device only. Hence, when an en-queue operation is performed upon the memory device, an initial count value is stored into the memory. When a de-queue operation is performed upon the memory device, a stored count value is read from a memory location, decreased by one, and then written back to the same memory location. In general, the memory device needs several clock cycles to finish one de-queue operation. Besides, most memory devices only allow read or write at one time. Therefore, if the en-queue or de-queue rate is high (i.e., the switch device is used in a high-speed network), the operating frequency of the memory device cannot meet the bandwidth requirement.

In another conventional design, a counter storage device is realized by a flip-flop array only. Each flip-flop in the flip-flop array is capable of finishing one de-queue operation (which directly updates a stored count value) in a single clock cycle. Hence, if the en-queue or de-queue rate is high (i.e., the switch device is used in a high-speed network), the operating frequency of the flip-flop array is able to meet the bandwidth requirement. However, the area of the flip-flop array is usually 8-12 times as large as that of the memory device if there is the same size of m-words by n-bits. As a result, the cost is high when the counter storage device is implemented using the flip-flop array.

Thus, there is a need for an innovative replication counter storage design which can meet the bandwidth requirement with acceptable area and cost.

SUMMARY

In accordance with exemplary embodiments of the present invention, a multi-level replication counter storage device for multicast packet processing and related method for managing multicast packet processing are proposed to solve the above-mentioned problem.

According to a first aspect of the present invention, an exemplary multi-level replication counter storage device for multicast packet processing is disclosed. The exemplary multi-level replication counter storage device includes a first-level storage device and a second-level storage device. The first-level storage device is configured to store a plurality of first count values associated with a same cell data of a first multicast packet required to be broadcasted to a plurality of multicast targets, wherein a sum of the stored first count values is equal to a number of multicast targets to which the same cell data of the first multicast packet is not broadcasted yet. The second-level storage device is configured to store a second count value which is adjusted based on the first count values to indicate whether a multicast operation of the same cell data of the first multicast packet is accomplished.

According to a second aspect of the present invention, an exemplary method for managing multicast packet processing is disclosed. The exemplary method includes: storing a plurality of first count values associated with a same cell data of a first multicast packet required to be broadcasted to a plurality of multicast targets in a first-level storage device, wherein a sum of the stored first count values is equal to a number of multicast targets to which the same cell data of the first multicast packet is not broadcasted yet; and storing a second count value in a second-level storage device, wherein the stored second count value is adjusted based on the first count values to indicate whether a multicast operation of the same cell data of the first multicast packet is accomplished.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main concept of the present invention is to combine advantages of a memory device and a flip-flop array. Hence, a multi-level replication counter storage device for multicast packet processing is proposed to meet the bandwidth requirement with acceptable area and cost. For example, a single-layer multi-bank multi-level storage or a multi-layer multi-bank multi-level storage may be used by a multicast control mechanism in a network device (e.g., a network switch). Further details will be described with reference to the accompanying drawings.

Figure 1:
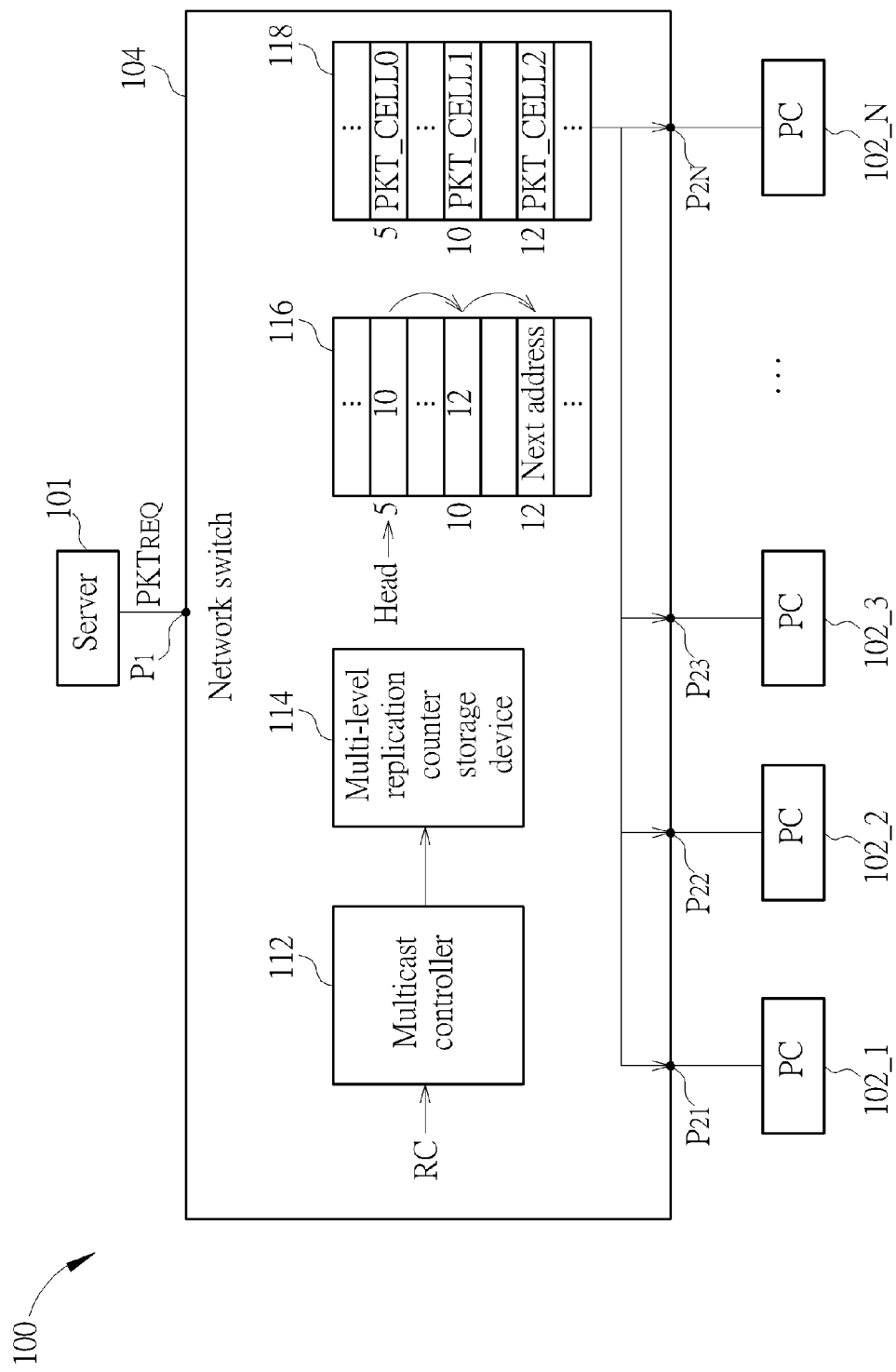
FIG. 1 is a block diagram illustrating a network system according to an embodiment of the present invention.

Please refer to FIG. 1, which is a block diagram illustrating a network system according to an embodiment of the present invention.

The network system 100 includes a source electronic device (e.g., a server 101), a plurality of destination electronic devices (e.g., personal computers 102_1, 102_2, 102_3, . . . 102_N), and a network switch 104 coupled between the source electronic device and the destination electronic devices for forwarding one or more requested packets $PKT_{REQ}$ from the source electronic device to one or more destination electronic devices. As shown in FIG. 1, the server 101 is connected to one ingress port $P_1$ of the network switch 104, and the personal computers 102_1-102_N are connected to egress ports $P_{21}$, $P_{22}$, . . . , $P_{2N}$, respectively. Consider a case where a group of destination electronic devices (e.g., personal computers 102_1-102_N) asks for the same packet from the source electronic device (e.g., server 101), the network switch 104 can receive the requested packet (i.e., a multicast packet) from the server 101 in a single transmission, and then performs a multicast operation to deliver/broadcast copies of the multicast packet to the personal computers 102_1-102_N in respective transmissions. As shown in FIG. 1, the network switch 104 includes, but is not limited to, a multicast controller 112, a multi-level replication counter storage device 114, a linked list storage device 116, and a packet buffer 118.

Free storage spaces in the packet buffer 118 may be distributed at discontinuous memory locations. Hence, when the network switch 104 receives the requested packet (i.e., multicast packet) from the ingress port $P_1$, the network switch 104 may store cells of the requested packet (i.e., multicast packet) into discontinuous memory locations of the packet buffer 118. For example, the first cell data PKT_CELL0 of the multicast packet is stored at a memory address '5', the next cell data PKT_CELL1 of the multicast packet is stored at a different memory address '10', the next cell data PKT_CELL2 of the multicast packet is stored at a different memory address '12', and so on. To manage packet cell data stored in the packet buffer 118, a linked list is created in the linked list storage device 116. In this example, the head node of the linked list for the stored multicast packet is at the memory address '5', and the next address recorded in the head node is '10', meaning that the next node in the linked list is at memory address '10. Similarly, as the next address recorded in the node at memory address '10' is '12', the next node is located at the memory address '12'. Hence, based on the node sequence recorded by the created linked list, the cell data of the multicast packet can be correctly read from the packet buffer 118.

The multicast controller 112 may receive a replication count value RC which is set by the number of multicast/broadcast targets in the network system 100 that request the same multicast packet. Considering this case where personal computers 102_1-102_N ask for the same packet from the server (e.g., a multimedia server) 101, the replication count value RC is equal to N. In contrast to the conventional replication counter storage design only using a memory device or a flip-flop array to record the replication count value RC and then decrease the stored replication count value RC to reflect delivery/broadcast of copies of the multicast packet, the present invention proposes using a hybrid storage design that has a memory device (e.g., a dynamic random access memory (DRAM) or a static random access memory (SRAM)) collaborating with a flip-flop array to manage the multicast packet processing. Therefore, the multi-level replication counter storage device 114 can have the advantage of the memory device (e.g., lower cost and smaller area) and the advantage of the flip-flop array (e.g., faster de-queue speed). Further details of the proposed multi-level replication counter storage device 114 are described as below.

Figure 2:
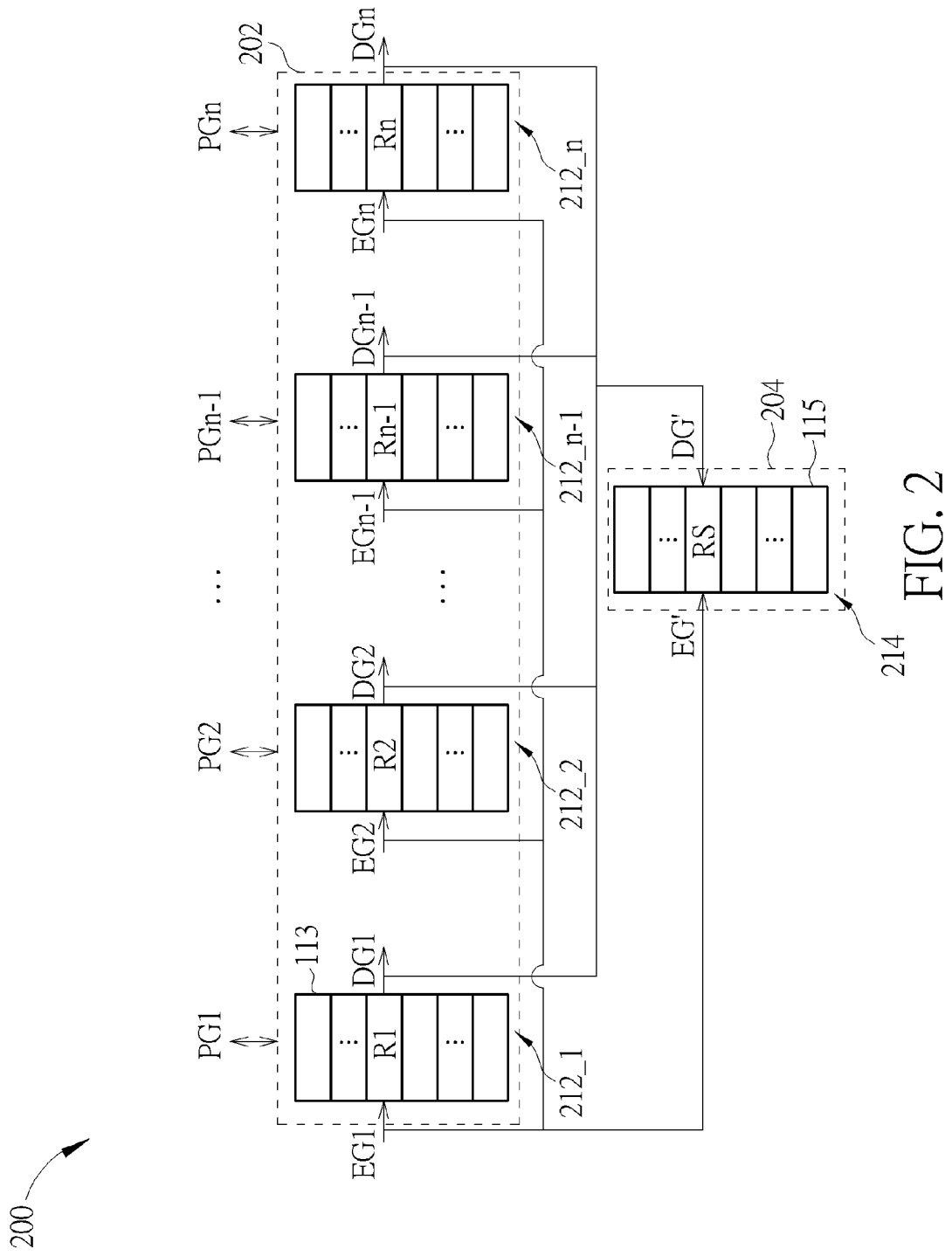
FIG. 2 is a diagram illustrating a multi-level replication counter storage device according to an embodiment of the present invention.

Please refer to FIG. 2, which is a diagram illustrating a multi-level replication counter storage device according to an embodiment of the present invention. The multi-level replication counter storage device 200 employs a single-layer multi-bank multi-level counter storage structure, and may be used to realize the multi-level replication counter storage device 114 in the network switch 104 shown in FIG. 1. The multi-level replication counter storage device 200 includes a first-level storage device 202 and a second-level storage device 204. The first-level storage device 202 and the second-level storage device 204 have different data access characteristics. For example, the first-level storage device 202 accomplishes one de-queue operation by updating its stored count value in K clock cycles, the second-level storage device 204 accomplishes one de-queue operation by updating its stored count value in L clock cycles, where K and L are positive integers, and K>L. That is, compared to the first-level storage device 202, the second-level storage device 204 is able to support a faster de-queue operation. In general, there is a tradeoff between de-queue speed and hardware cost/area. Hence, compared to the second-level storage device 204, the first-level storage device 202 has a smaller area and a lower cost. In a preferred embodiment, the first-level storage device 202 may be implemented using a memory device (e.g., DRAM or SRAM) having a plurality of storage modules (e.g., memory banks) 212_1, 212_2, . . . , 212_n–1, 212_n, where each of the storage modules 212_1-212_n is composed of a plurality of storage spaces 113 at different storage locations; besides, the second-level storage device 204 may be implemented using a flip-flop array 214 composed of a plurality of sets of flip-flops 115 at different storage locations.

The number n of storage modules 212_1-212_n implemented in the first-level storage device 202 depends upon actual design consideration. For example, if each of the storage modules 212_1-212_n requires four clock cycles to accomplish one de-queue operation (which reads a stored first count value from a memory location, adjusts the first count value, and write the adjusted first count value into the same memory location), four storage modules may be implemented in the first-level storage device 202 (i.e., n=4). However, this is for illustrative purposes only, and is not meant to be a limitation of the present invention.

The first-level storage device 202 is configured to store a plurality of first count values R1, R2, . . . Rn–1, Rn associated with the same cell data of a multicast packet (e.g., cell data PKT_CELL0 buffered at a memory address '5' of the packet buffer 118) that is required to be broadcasted to a plurality of multicast targets. The sum of the stored first count values R1-Rn is equal to the number of multicast targets to which the same cell data of the multicast packet is not broadcasted yet. Consider a case where the multicast targets are personal computers 102_1-102_N shown in FIG. 1, the replication count value RC received by the multicast controller 112 would be equal to N. In the beginning, RC=R1+R2+ . . . +Rn−1+Rn=N because the multicast packet cell data transmission between the network switch 104 and the multicast targets is not started yet. In this embodiment, the multicast controller 112 would divide the replication count value RC into the first count values R1-Rn based on the setting of port groups PG1, PG2, . . . , PGn−1, PGn. Specifically, the storage modules 212_1-212_n correspond to the port groups PG1-PGn, respectively. Each of the multicast targets (e.g., personal computers 102_1-102_N) is coupled to one egress port of the port groups PG1-PGn. In a preferred embodiment, the multicast targets are assigned to the port groups PG1-PGn, evenly or almost evenly. More specifically, if N is divisible by n, each of the first count values R1-Rn may be set by the same value N/n due to the fact that each of the port groups PG1-PGn is coupled to N/n multicast targets. However, if N is not divisible by n, some of the first count values R1-Rn may be set by one value CV (e.g., CV=floor(N/n)), while the rest of the first count values may be set by another value (CV+1). However, this is for illustrative purposes only, and is not meant to be a limitation of the present invention.

When the multicast packet is stored into the packet buffer 118, the multicast controller 112 is operative to perform a plurality of en-queue operations EG1, EG2, EGn−1, EGn upon respective storage modules 212_1-212_n at the same time. In this embodiment, a first count value stored into a storage module by an en-queue operation is set by the number of multicast targets belonging to a port group associated with the storage module. For example, if a port group PGx (x=1~n) has X egress ports connected to X multicast targets respectively, the multicast controller 112 assigns an initial value X to the first count value Rx. Regarding each of the port groups PG1-PGn, a corresponding first count value would indicate the number of multicast targets to which the same cell data of the multicast packet is not broadcasted yet. Therefore, before the multicast packet cell data transmission between the network switch 104 and the multicast targets is started, each initial value X would be representative of the maximum number of times the same cell data of the multicast packet should be delivered/broadcasted via the port group PGx.

Preferably, the storage locations in which the first count values R1-Rn are stored are synchronized with the storage location of the same cell data of the multicast packet in the packet buffer 118. For example, when the first count values R1-Rn are associated with the same cell data PKT_CELL0 of the multicast packet, the first count values R1-Rn are stored in co-located storage spaces at the same memory address '5' in the storage modules 212_1-212_n.

When the same cell data of the multicast packet in the packet buffer is broadcasted through one port of a port group, the multicast controller 112 performs a de-queue operation upon a storage module associated with the port group. For example, when the same cell data of the multicast packet is broadcasted to one multicast target through multiple ports each selected from one of the port groups PG1-PGn, the multicast controller 112 is operative to perform a plurality of de-queue operations DG1, DG2, DGn−1, DGn upon the storage modules 212_1-212_n, respectively. As mentioned above, a de-queue operation performed upon a storage module includes reading a stored first count value from a storage location, adjusting the first count value read from the storage location, and then writing the adjusted first count value into the same storage location. Taking the de-queue operation DG1 performed upon the storage module 212_1 for example, the first count value R1 is read, decreased by one (i.e., R1=R1-1), and then written back.

For better understanding of the principle of the first-level storage device 202, an example of managing a first count value stored in a storage module is given as below. Suppose that the port group PG1 includes egress ports $P_{21}$, $P_{22}$ and $P_{23}$ shown in FIG. 1. When a cell data (e.g., PKT_CELL0) of a multicast packet is stored into the packet buffer 118, an en-queue operation is performed upon the storage module 212_1, such that the first count value R1 initially set by 3 (i.e., R1=3) is stored in a storage space of the storage module 212_1. When a first copy of the cell data (e.g., PKT_CELL0) is delivered to one of the personal computers 102_1-102_3 through one egress port of the port group PG1, a de-queue operation is performed upon the storage module 212_1 to update the first count value R1. Since the first count value R1 is used to indicate the number of multicast targets to which the cell data (e.g., PKT_CELL0) is not broadcasted yet, the first count value R1 is decreased by one in response to one transmission of the cell data (e.g., PKT_CELL0) from the network switch 104 to one of the personal computers 102_1-102_3. Hence, the first count value R1 updated to 2 is now stored in the storage module 212_1.

When a second copy of the cell data (e.g., PKT_CELL0) is delivered to another of the personal computers 102_1-102_3 through another egress port of the port group PG1, a de-queue operation is performed upon the storage module 212_1 again to update the first count value R1. Since the first count value R1 is used to indicate the number of multicast targets to which the cell data (e.g., PKT_CELL0) is not broadcasted yet, the first count value R1 is decreased by one in response to one transmission of the cell data (e.g., PKT_CELL0) from the network switch 104 to another of the personal computers 102_1-102_3. Hence, the first count value R1 updated to 1 is now stored in the storage module 212_1.

When a third copy of the cell data (e.g., PKT_CELL0) is delivered to yet another of the personal computers 102_1-102_3 through yet another egress port of the port group PG1, a de-queue operation is performed upon the storage module 212_1 again to update the first count value R1. Since the first count value R1 is used to indicate the number of multicast targets to which the cell data (e.g., PKT_CELL0) is not broadcasted yet, the first count value R1 is decreased by one in response to one transmission of the cell data (e.g., PKT_CELL0) from the network switch 104 to yet another of the personal computers 102_1-102_3. Hence, the first count value R1 updated to 0 is now stored in the storage module 212_1. After the first count value R1 is no longer a non-zero value, it means the partial multicast operation for the personal computers 102_1-102_3 coupled to egress ports belonging to the same port group PG1 is accomplished.

As a person skilled in the art can readily understand the operation of managing other first count values R2-Rn stored in other storage modules 212_2-212_n after reading above paragraphs, further description is omitted here for brevity. It is self-explanatory that, after each of the stored first count values R1-Rn is equal to a predetermined value (i.e., 0), the multicast operation of the same cell data (e.g., PKT_CELL0) of the multicast packet is accomplished.

As mentioned above, the original replication count value RC is divided into first count values R1-Rn that are maintained in different storage modules 212_1-212_n respectively. Hence, there is a need for monitoring the first count values R1-Rn to determine whether the multicast operation of the same cell data (e.g., PKT_CELL0) of the multicast packet is accomplished. In this embodiment, the second-level storage device 204 shown in FIG. 1 is used to deal with this task due its faster de-queue speed. Specifically, the second-level storage device 204 is configured to store a second count value RS which is adjusted based on the first count values R1-Rn to thereby indicate whether the multicast operation of the same cell data of the multicast packet is accomplished. For example, when the second count value RS reaches a predetermined value (e.g., 0), it means the multicast operation of the same cell data of the multicast packet is accomplished.

When the multicast packet is stored into the packet buffer 118, the multicast controller 112 is operative to further perform an en-queue operation EG' upon the second-level storage device 204. In this embodiment, the second-level storage device 204 is implemented using the flip-flop array 214. Therefore, the second count value RS stored into one set of flip-flops in the flip-flop array 214 by the en-queue operation EG' is initially set by the number of the storage modules 212_1-212_n implemented in the first-level storage device 202. To put it another way, since the first count values R1-Rn are non-zero values initially due to that fact that the multicast packet data transmission between the network switch 104 and the multicast targets is not started yet, an initial value of the second count value RS would be equal to the number of non-zero first count values R1-Rn.

The multicast controller 112 will perform at least one de-queue operation DG' upon the second-level storage 204 each time at least one first count value reaches a predetermined value (e.g., 0). As the second-level storage 204 is implemented using the flip-flop array 114, the second-level storage 204 is able to react to multiple de-queue operations DG' in one clock cycle. Specifically, when there is only one de-queue operation DG' triggered due to a single first count value reaching the predetermined value (e.g., 0), the flip-flop array 114 directly updates the internally stored second count value RS by an adjusted value (e.g., RS=RS−1). When there are S de-queue operations DG' simultaneously triggered due to S first count values each reaching the predetermined value (e.g., 0), the flip-flop array 114 directly updates the internally stored second count value RS by an adjusted value (e.g., RS=RS−S). Briefly summarized, the second count value RS may be set based on following pseudo codes.

RS=PR1+PR2+ . . . +PRn,
if (Rx !=0), then PRx=1,
else PRx=0
where x=0, 1, 2, . . . , n When the second count value RS is no longer a non-zero value, meaning that all of the first count values R1-Rn are equal to the predetermined value (e.g., 0) now, the multicast controller 112 therefore acknowledges the end of the multicast operation of the same cell data of the multicast packet. At this moment, the storage spaces occupied by first count values R1-Rn and second count value RS can be released and re-used.

Though each of the storage modules (e.g., memory banks) 212_1-212_n in the first-level storage device 202 takes several clock cycles to accomplish one de-queue operation (which may include read-out, decrement and write-back), the storage modules (e.g., memory banks) 212_1-212_n can serve several de-queue operation at the same time. Hence, the parallel de-queue processing is equivalent to accomplishing several de-queue operations within several clock cycles. Suppose that a memory device takes 4 clock cycles to accomplish one de-queue operation, one clock cycle to accomplish one en-queue operation, and the number of multicast targets is equal to 4. The conventional memory-based replication counter storage design would need at least 17 (i.e., 1+4*4) clock cycles to accomplish a multicast operation of the same cell data of a multicast packet. However, concerning the first-level storage device 202 using the proposed multi-bank architecture, it only needs at least 5 (i.e., 1+4) clock cycles to accomplish a multicast operation of the same cell data of a multicast packet. Therefore, due to parallel processing of multiple de-queue operations of the memory-based storage modules, the proposed multi-bank architecture is capable of supporting a high de-queue rate satisfying the bandwidth requirement of packet multicast in a high-speed network.

Since the proposed multi-bank architecture allows parallel processing of multiple de-queue operations of the memory-based storage modules, the present invention therefore proposes multi-level architecture which uses a second-level storage device 204, such as the flip-flop array 214, to instantly serve multiple de-queue operations simultaneously triggered by a parallel processing result of multiple de-queue operations of the storage modules 212_1-212_n in the first-level storage device 202. In short, no matter how many first count values are decreased to 0 at the same time, the second-level storage device 204 can update the second count value RS in time to promptly reflect the current status of the multicast operation.

The combination of a memory device and a flip-flop array is capable of meeting the bandwidth requirement with acceptable cost and area. Suppose that the original replication counter needs w*d bits, where w represents the number of entries (i.e., the depth of the replication counter), and d represents the number of bits per entry. If the area factor of memory versus flip-flop is 1:α (in the example cases here for simplicity, a unit of memory area is assumed to be 1). When the replication counter is implemented using flip-flops only, the area of the replication counter is α·w·d. However, when the replication counter is implemented using the proposed hybrid storage architecture, the area of the 1-layer n-bank 2-level replication counter is n·w·(d−log$_2$ n)+α·w·log$_2$ n. Hence, compared to the conventional design, the proposed hybrid design will be more cost-effective and area-effective under the conditions: (1) if n<α, then log$_2$ n<d, (2) if n>=α, then log$_2$ n>d. However, this is for illustrative purposes only, and is not meant to be a limitation of the present invention. That is, any replication counter storage design using the proposed hybrid storage architecture falls within the scope of the present invention.

In some applications, the en-queue rate would be higher due to multiple en-queue operations simultaneously triggered by multiple multicast packets stored into the packet buffer in a single clock cycle. The one-layer multi-bank replication counter structure shown in FIG. 2 may fail to meet such a high en-queue rate requirement. Therefore, the present invention further proposes a multi-layer multi-bank replication counter structure to sustain the en-queue rate. Specifically, in every clock cycle, each level of the hybrid replication counter storage will serve multiple en-queue operations at one time. In other words, the ingress port may be regarded as divided into multiple portions, such that each portion is allowed to have a reduced en-queue rate. By way of example, a two-layer multi-bank multi-level replication counter may be used to deal with transmission of two multicast packets simultaneously stored into the packet buffer.

Figure 3:
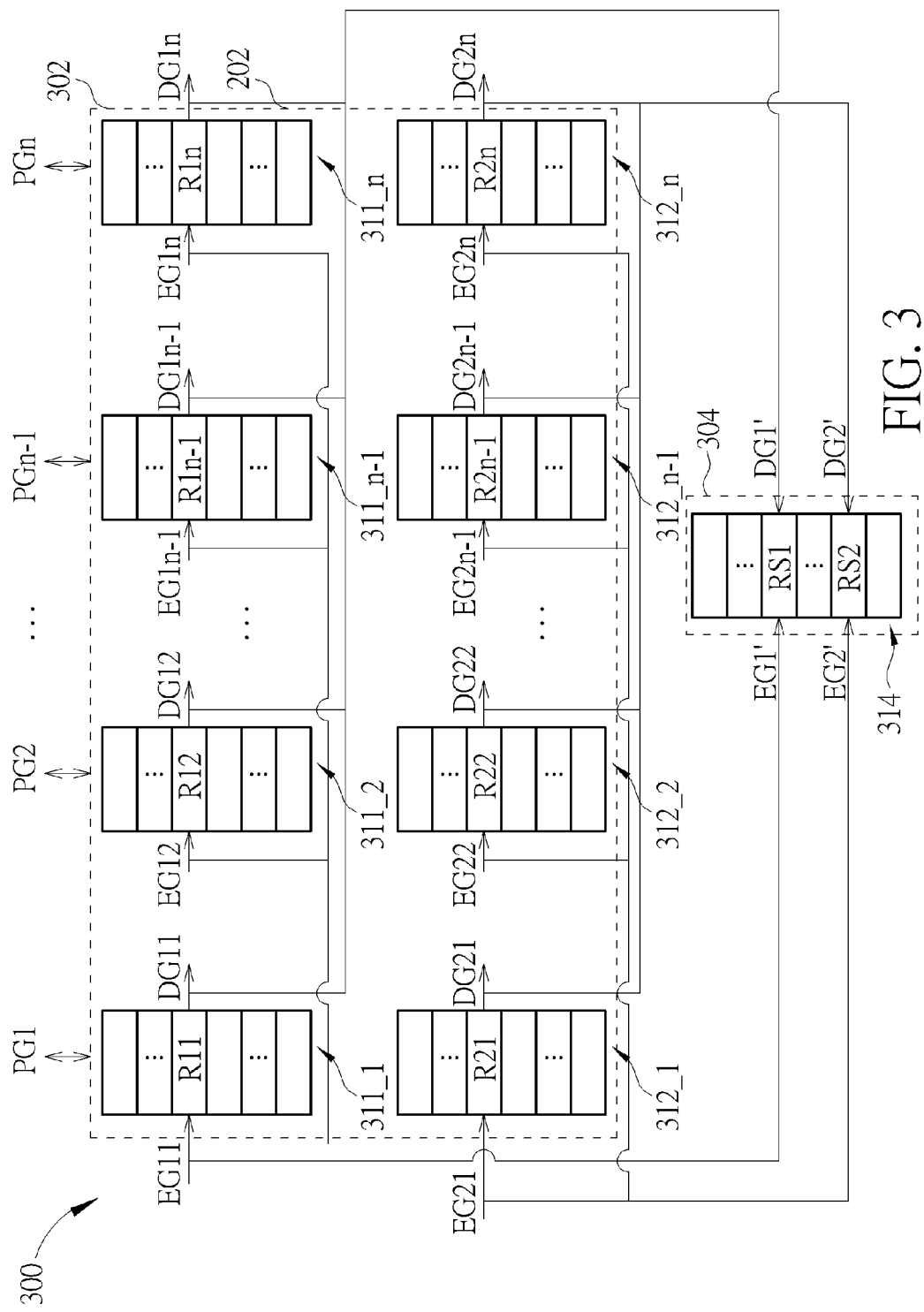
FIG. 3 is a diagram illustrating a multi-level replication counter storage device according to another embodiment of the present invention.

Please refer to FIG. 3, which is a diagram illustrating a multi-level replication counter storage device according to another embodiment of the present invention. The multi-level replication counter storage device 300 employs two-layer multi-bank multi-level counter storage architecture, and may be used to realize the multi-level replication counter storage device 114 in the network switch 104 shown in FIG. 1. Like the multi-level replication counter storage device 200, the multi-level replication counter storage device 300 also includes a first-level storage device 302 and a second-level storage device 304, where the first-level storage device 302 may be implemented using a memory device (e.g., SRAM or DRAM) with multiple storage modules (e.g., memory banks) 311_1-311_n, 312_1-312_n, and the second-level storage device 304 may be implemented using a flip-flop array 314. The major difference between the multi-level replication counter storage devices 200 and 300 is the first-level storage device 302 configured to have two layers of storage modules corresponding to two different multicast packets. It should be noted that the number of layers of storage modules is not limited to two, and may be adjusted based on the actual design requirement.

In this embodiment, one layer of storage modules includes first storage modules 311_1, 311_2, . . . , 311_n–1, 311_n corresponding to a plurality of port groups PG1, PG2, . . . PGn–1, PGn, respectively; and another layer of storage modules includes second storage modules 312_1, 312_2, . . . , 312_n–1, 312_n corresponding to the port groups PG1-PGn (not shown), respectively. The multicast controller 112 performs en-queue operations EG11, EG12, . . . EG1n–1, EG1n upon the first storage modules 311_1-311_n to store first count values R11, R12, . . . , R1n–1, R1n in response to one cell data of a first multicast packet that is stored into the packet buffer 118 in a clock cycle, and also performs en-queue operations EG21, EG22, . . . EG2n–1, EG2n upon the second storage modules 312_1-312_n to store third count values R21, R22, . . . R2n–1, R2n in response to one cell data of a second multicast packet that is stored into the packet buffer 118 in the same clock cycle. In other words, the first count values R11-R1n are associated with the same cell data of the first multicast packet, and the third count values R21-R2n are associated with the same cell data of the second multicast packet different from the first multicast packet. Hence, the sum of the stored first count values R11-R1n reflects the number of multicast targets to which the same cell data of the first multicast packet is not broadcasted yet; and the sum of the stored third count values R21-R2n reflects the number of multicast targets to which the same cell data of the second multicast packet is not broadcasted yet.

Besides, the multicast controller 112 performs one en-queue operation EG1' to store a second count value RS1 into one set of flop-flops in the flip-flop array 314, and performs another en-queue operation EG2' to store a fourth count value RS2 into another set of flop-flops in the flip-flop array 314. The second count value RS1 is adjusted based on the first count values R11-R1n to thereby indicate whether a multicast operation of the same cell data of the first multicast packet is accomplished. The fourth count value RS2 is adjusted based on the third count values R21-R2n to thereby indicate whether a multicast operation of the same cell data of the second multicast packet is accomplished.

The principle of the en-queue operations EG11-EG1n and EG21-EG2n is identical to that of the en-queue operations EG1-EGn mentioned above, and the principle of the en-queue operations EG1' and EG2' is identical to that of the en-queue operation EG' mentioned above. Besides, the principle of the de-queue operations DG11-DG1n and DG21-DG2n is identical to that of the de-queue operations DG1-DGn mentioned above, and the principle of the de-queue operations DG1' and DG2' is identical to that of the de-queue operation DG' mentioned. Further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-level replication counter storage device for multicast packet processing, comprising:
   a first-level storage device, configured to store a plurality of first count values associated with a same cell data of a first multicast packet required to be broadcasted to a plurality of multicast targets, wherein a sum of the stored first count values is equal to a number of multicast targets to which the same cell data of the first multicast packet is not broadcasted yet; and
   a second-level storage device, configured to store a second count value which is adjusted based on the first count values to indicate whether a multicast operation of the same cell data of the first multicast packet is accomplished;
   wherein the first-level storage device accomplishes one de-queue operation by updating a first count value in K clock cycles, the second-level storage device accomplishes one de-queue operation by updating the second count value in L clock cycles, K and L are positive integers, and K>L.

2. The multi-level replication counter storage device of claim 1, wherein the first-level storage device comprises:
   a plurality of storage modules, wherein the first count values are stored in the storage modules, respectively.

3. The multi-level replication counter storage device of claim 2, wherein each of the storage modules has a plurality of storage spaces, and the first count values are stored in co-located storage spaces in the storage modules.

4. The multi-level replication counter storage device of claim 2, wherein the storage modules correspond to a plurality of port groups, respectively; each of the multicast targets is coupled to one port of the port groups; and a first count value stored into a storage module by an en-queue operation is set by a number of multicast targets belonging to a port group associated with the storage module.

5. The multi-level replication counter storage device of claim 2, wherein the storage modules correspond to a plurality of port groups, respectively; each of the multicast targets is coupled to one port of the port groups; and a first count value stored in a storage module is adjusted by a de-queue operation when the same cell data of the first multicast packet is broadcasted through one port of a port group associated with the storage module.

6. The multi-level replication counter storage device of claim 2, wherein the second count value stored into the second-level storage device by an en-queue operation is set by a number of the storage modules.

7. The multi-level replication counter storage device of claim 2, wherein the second count value stored in the second-level storage device is adjusted by at least one de-queue operation triggered due to at least one first count value reaching a predetermined value.

8. The multi-level replication counter storage device of claim 1, wherein multiple multicast packets, including the first multicast packet and a second multicast packet, are buffered in a single clock cycle; the first-level storage device is further configured to store a plurality of third count values associated with a same cell data of the second multicast packet required to be broadcasted to the multicast targets; a sum of the stored third count values is equal to a number of multicast targets to which the same cell data of the second multicast packet is not broadcasted yet; and the second-level storage device is further configured to store a fourth count value which is adjusted based on the third count values to indicate whether a multicast operation of the same cell data of the second multicast packet is accomplished.

9. The multi-level replication counter storage device of claim 1, wherein the first-level storage device is a memory device, and the second-level storage device is a flip-flop array.

10. A method for managing multicast packet processing, comprising:
    storing a plurality of first count values associated with a same cell data of a first multicast packet required to be broadcasted to a plurality of multicast targets in a first-level storage device, wherein a sum of the stored first count values is equal to a number of multicast targets to which the same cell data of the first multicast packet is not broadcasted yet;
    storing a second count value in a second-level storage device, wherein the stored second count value is adjusted based on the first count values to indicate whether a multicast operation of the same cell data of the first multicast packet is accomplished;
    utilizing the first-level storage device to accomplish one de-queue operation by updating a first count value in K clock cycles; and
    utilizing the second-level storage device to accomplish one de-queue operation by updating the second count value in L clock cycles;
    wherein K and L are positive integers, and K>L.

11. The method of claim 10, wherein the first-level storage device comprises a plurality of storage modules; and the step of storing the first count values comprises:
    storing the first count values in the storage modules, respectively.

12. The method of claim 11, wherein each of the storage modules has a plurality of storage spaces, and the step of storing the first count values in the storage modules comprises:
    storing the first count values in co-located storage spaces in the storage modules.

13. The method of claim 11, wherein the storage modules correspond to a plurality of port groups, respectively; each of the multicast targets is coupled to one port of the port groups; and the method further comprising:
    when an en-queue operation is performed upon a storage module, setting a first count value stored into the storage module by a number of multicast targets belonging to a port group associated with the storage module.

14. The method of claim 11, wherein the storage modules correspond to a plurality of port groups, respectively; each of the multicast targets is coupled to one port of the port groups; and the method further comprises:
    when the same cell data of the first multicast packet is broadcasted through one port of a port group associated with a storage module, performing a de-queue operation upon the storage module to adjust a first count value stored in the storage module.

15. The method of claim 11, further comprising:
    when an en-queue operation is performed upon the second-level storage device, setting the second count value stored into the second-level storage device by a number of the storage modules.

16. The method of claim 11, further comprising:
    when at least one de-queue operation is triggered due to at least one first count value reaching a predetermined value, adjusting the second count value stored in the second-level storage device.

17. The method of claim 10, wherein multiple multicast packets, including the first multicast packet and a second multicast packet, are buffered in a single clock cycle; and the method further comprises:
    storing a plurality of third count values associated with a same cell data of the second multicast packet required to be broadcasted to the multicast targets in the first-level storage device, wherein a sum of the stored third count values is equal to a number of multicast targets to which the same cell data of the second multicast packet is not broadcasted yet; and
    storing a fourth count value in the second-level storage device, wherein the fourth count value is adjusted based on the third count values to indicate whether a multicast operation of the same cell data of the second multicast packet is accomplished.

18. The method of claim 10, wherein the first-level storage device is a memory device, and the second-level storage device is a flip-flop array.

19. A multi-level replication counter storage device for multicast packet processing, comprising:
    a first-level storage device, configured to store a plurality of first count values associated with a same cell data of a first multicast packet required to be broadcasted to a plurality of multicast targets, wherein a sum of the stored first count values is equal to a number of multicast targets to which the same cell data of the first multicast packet is not broadcasted yet; and
    a second-level storage device, configured to store a second count value which is adjusted based on the first count values to indicate whether a multicast operation of the same cell data of the first multicast packet is accomplished;
    wherein multiple multicast packets, including the first multicast packet and a second multicast packet, are buffered in a single clock cycle; the first-level storage device is further configured to store a plurality of third count values associated with a same cell data of the second multicast packet required to be broadcasted to the multicast targets; a sum of the stored third count values is equal to a number of multicast targets to which the same cell data of the second multicast packet is not broadcasted yet; and the second-level storage device is further configured to store a fourth count value which is adjusted based on the third count values to indicate whether a multicast operation of the same cell data of the second multicast packet is accomplished.

* * * * *